United States Patent
Lorch

(10) Patent No.: US 9,098,311 B2
(45) Date of Patent: Aug. 4, 2015

(54) USER INTERFACE ELEMENT FOR DATA RATING AND VALIDATION

(75) Inventor: Robert Lorch, Dossenheim (DE)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 12/828,727

(22) Filed: Jul. 1, 2010

(65) Prior Publication Data

US 2012/0005594 A1   Jan. 5, 2012

(51) Int. Cl.
G06F 3/048    (2013.01)
G06F 9/44     (2006.01)
G06F 17/24    (2006.01)
G06F 3/0481   (2013.01)

(52) U.S. Cl.
CPC .............. G06F 9/4443 (2013.01); G06F 8/38 (2013.01); G06F 17/243 (2013.01); *G06F 3/0481* (2013.01)

(58) Field of Classification Search
CPC . G06F 11/0745; G06F 3/0481; G06F 17/243; G06F 3/04895; G06F 8/38; G06Q 30/0601
USPC ........................................................ 715/747
See application file for complete search history.

(56) References Cited

U.S. PATENT DOCUMENTS

| | | | |
|---|---|---|---|
| 6,460,042 B1 * | 10/2002 | Hitchcock et al. ................ | 1/1 |
| 6,539,392 B1 * | 3/2003 | Rebane ........................ | 705/7.31 |
| 6,564,263 B1 | 5/2003 | Bergman et al. | |
| 6,791,587 B1 * | 9/2004 | Bamford et al. .............. | 715/854 |
| 7,376,891 B2 * | 5/2008 | Hitchock et al. .............. | 715/221 |
| 7,496,610 B2 * | 2/2009 | Boris et al. ................... | 1/1 |
| 7,526,494 B2 * | 4/2009 | Rom et al. ..................... | 1/1 |
| 7,908,248 B2 * | 3/2011 | Brunswig et al. ............ | 707/640 |
| 7,937,400 B2 | 5/2011 | Carmeli et al. | |
| 8,001,056 B2 * | 8/2011 | Tesler et al. .................. | 705/319 |
| 8,024,342 B2 | 9/2011 | Li et al. | |
| 8,126,899 B2 | 2/2012 | Smith et al. | |
| 8,209,338 B2 | 6/2012 | Wallace et al. | |

(Continued)

FOREIGN PATENT DOCUMENTS

EP    2 110 760 A1    10/2009

OTHER PUBLICATIONS

Evers, S. Form follows function: Editor GUIs in a functional style. Master's Thesis. Mathematics and Computer Science University of Twente, Mar. 2004.*

(Continued)

*Primary Examiner* — Amy M Levy
(74) *Attorney, Agent, or Firm* — Buckley, Maschoff & Talwalkar LLC

(57) ABSTRACT

According to some embodiments, a selection of a pre-determined user interface element type from a plurality of potential types is received from a user. An input rating value to be associated with a user interface element of the selected type may be received from the designer. The user interface element may, for example, receive data content in a graphical user interface. A pre-determined condition to be associated with the user interface element may also be received from the design. A user interface element may then be created to receive data content in the graphical user interface. According to some embodiments, it may be automatically determined if data content received from a user via the user interface element satisfies the pre-determined condition. Based on the determination, the input rating value may be automatically applied to a user input rating score associated with the graphical user interface.

41 Claims, 12 Drawing Sheets

(56) References Cited

U.S. PATENT DOCUMENTS

| | | |
|---|---|---|
| 8,224,851 B2 | 7/2012 | Banda et al. |
| 2003/0014434 A1* | 1/2003 | Sebesta ............... 707/500 |
| 2004/0243931 A1* | 12/2004 | Stevens et al. ......... 715/513 |
| 2005/0144182 A1* | 6/2005 | Boris et al. ............ 707/100 |
| 2005/0154708 A1 | 7/2005 | Sun |
| 2006/0107224 A1* | 5/2006 | Friend et al. ........... 715/764 |
| 2006/0230338 A1* | 10/2006 | Kelkar et al. ........... 715/505 |
| 2007/0043761 A1 | 2/2007 | Chim et al. |
| 2007/0192163 A1* | 8/2007 | Barr ..................... 705/10 |
| 2008/0201201 A1* | 8/2008 | Pousti et al. ............ 705/10 |
| 2008/0270240 A1* | 10/2008 | Chu ...................... 705/14 |
| 2009/0024605 A1* | 1/2009 | Yang ..................... 707/5 |
| 2009/0043813 A1* | 2/2009 | Moore et al. ........... 707/104.1 |
| 2009/0138454 A1 | 5/2009 | Rayner et al. |
| 2009/0177955 A1 | 7/2009 | Liu et al. |
| 2009/0299824 A1* | 12/2009 | Barnes, Jr. ............. 705/10 |
| 2009/0313601 A1* | 12/2009 | Baird et al. ............ 717/106 |
| 2009/0327289 A1 | 12/2009 | Zentner |
| 2009/0327320 A1 | 12/2009 | Yan et al. |
| 2010/0042615 A1 | 2/2010 | Rinearson |
| 2010/0114996 A1 | 5/2010 | Ding et al. |
| 2010/0162159 A1* | 6/2010 | Sudhi .................... 715/780 |
| 2011/0106967 A1 | 5/2011 | Bellessort et al. |
| 2011/0113047 A1 | 5/2011 | Guardalben |
| 2011/0131218 A1 | 6/2011 | Goldman et al. |
| 2012/0150893 A1 | 6/2012 | Inoue et al. |

OTHER PUBLICATIONS

Randolph et al. Professional Visual Studio® 2010. Wrox. May 3, 2010. retrieved from Safari Books Online. retrieved Jan. 3, 2010.*

* cited by examiner

600

Browser by Worldscape http://www.SAP.com/user_interface_for_data_rating_and_validation

PLEASE INPUT INFORMATION

Name
First: John
Last: Smith

| 7 | pt | ✓ |

610

Address
Street: 123 Main Street
City: Appletown
Country:

| 10 | pt | ✗ |

620

Contact
Email: smith@sap.com | 2 | pt | ✓
Phone: (123) 555-1234 | 2 | pt | ✓
Fax: (123) 555-5678 | 2 | pt | ✓

630

640

OVERALL SCORE: 13/23

*FIG. 6*

“USER INTERFACE ELEMENT FOR DATA RATING AND VALIDATION

FIELD

Some embodiments relate to user interface elements. More specifically, some embodiments provide a user interface element associated with data rating and validation.

BACKGROUND

A computer display may include one or more user interface elements. A user interface element might, for example, be utilized to display information to and/or receive information from a user. One example of a user interface element is a "text box" in which a user can type information (e.g., his or her name or address). Other examples of user interface elements include a check box that can be selected or deselected, a graphical input of a numerical value (e.g., displayed as a number or stars or as a sliding bar), and a "drop down" list of items that may be selected by a user.

The entry of data into a user interface element may, in some cases, be completely optional. In other cases, the entry of data into a user interface element may be mandatory. For example, a user interface might include both (1) a text box for the mandatory entry of a user name and (2) a text box for an optional entry of a user address. Often, mandatory elements are designated with a "*" symbol and/or are displayed in a different color (e.g., red) to let the user know which content on the display needs to be completed in order to proceed (e.g., to finish a login process).

For some applications, however, the "mandatory" and "optional" framework might not be flexible enough to achieve desired business goals. For example, a user interface might include ten input fields of which at least five must be completed by a user. Moreover, different fields might be associated with different levels of interest or importance. One approach to such a situation would be write special software code that evaluates data content entered by a user to determine whether or not the entered content is sufficient. This approach, however, can be a time consuming, costly, and error prone process. For example, the software code may need to be tested for a wide range of potential user inputs.

Accordingly, a method and mechanism for efficiently creating user interfaces such that an evaluation of data content entered by a user may be automatically performed are provided by some embodiments herein.

BRIEF DESCRIPTION OF THE DRAWINGS

FIGS. 4 through 6 are examples of user interfaces in accordance with some embodiments described herein.

DETAILED DESCRIPTION

A computer display may include one or more user interface elements. A user interface element might, for example, be utilized to display information to and/or receive information from a user. One example of a user interface element is a "text box" in which a user can type information (e.g., his or her name or address). Other examples of user interface elements include a check box that can be selected or deselected, a graphical input of a numerical value (e.g., displayed as a number or stars or as a sliding bar), and a "drop down" list of items that may be selected by a user.

Figure 1:
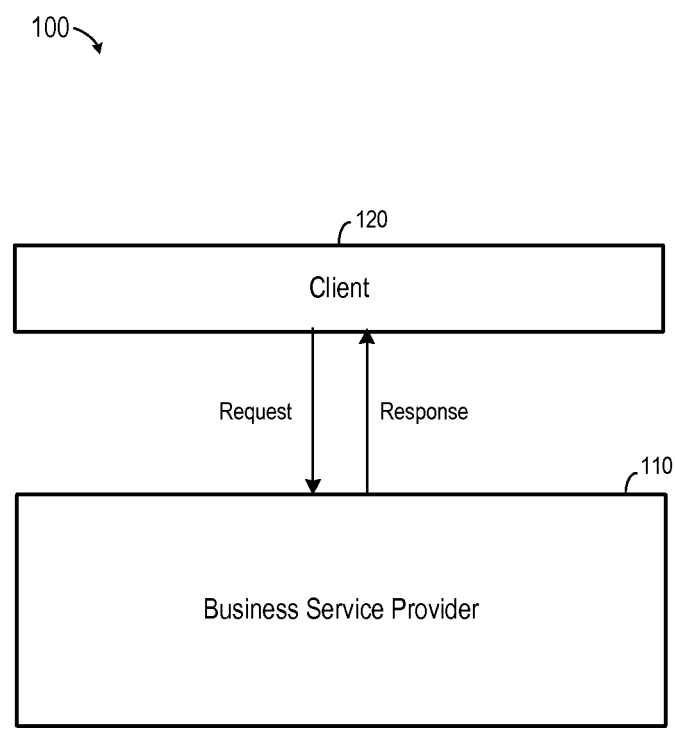
FIG. 1 is a block diagram of a system according to some embodiments.

Some embodiments described herein are associated with a business service provider. Note, however, that embodiments may be associated with any other type of user interface, including those associated with applications in various business areas, such as Customer Relation Management (CRM), Supplier Relation Management (SRM), finances, etc. The user interfaces may be implemented using any number of programming languages and/or techniques, such as Web Dynpro, JAVA, the Advanced Business Application Programming (ABAP) language, and other languages. Referring now to FIG. 1, an enterprise might store and access business information in a number of different ways. For example, an enterprise might store a substantial amount of information about production, sales, human resources, etc. in one or more database structures created by a business service provider (e.g., SAP AG). FIG. 1 is a block diagram of a system 100 according to some embodiments. In this case, a business service provider 110 might host and provide business services for a client 120. For example, the business service provider 110 might receive requests from the client 120 and provide responses to the client 120 via a service-oriented architecture such as those provided by SAP Business ByDesign®. Note that the business service provider 110 might represent any backend system, including backend systems that belong to the client 120, those that belong to (or are administered by) service providers, those that are web services, etc.

The client 120 may be associated with a Web browser to access services provided by business process platform 110 via HyperText Transport Protocol (HTTP) communication. For example, a user may manipulate a user interface of the client 120 to input an instruction (e.g., "show me a sales report"). The client 120, in response, may transmit a corresponding HTTP service request to the business service provider 110 as illustrated. A service-oriented architecture may conduct any processing required by the request (e.g., generating views and user interfaces) and, after completing the processing, provides a response to client 120. The client 120 might comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a dedicated standalone application.

Note that FIG. 1 represents a logical architecture for describing processes according to some embodiments, and actual implementations may include more or different elements arranged in other manners. Moreover, each system described herein may be implemented by any number of devices in communication via any number of other public and/or private networks. Two or more of devices of may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

The client 120 might use pre-defined user interface elements to interact with a user and with one or more database structures hosted by the business service provider 110. The entry of data into a user element may, in some cases, be completely optional. In other cases, the entry of data into a user element may be mandatory. Moreover, different fields might be associated with different levels of interest or importance.

Accordingly, a method and mechanism for efficiently creating user interfaces such that the evaluation of data content entered by a user may be automatically performed are provided by some embodiments herein.

Figure 2:
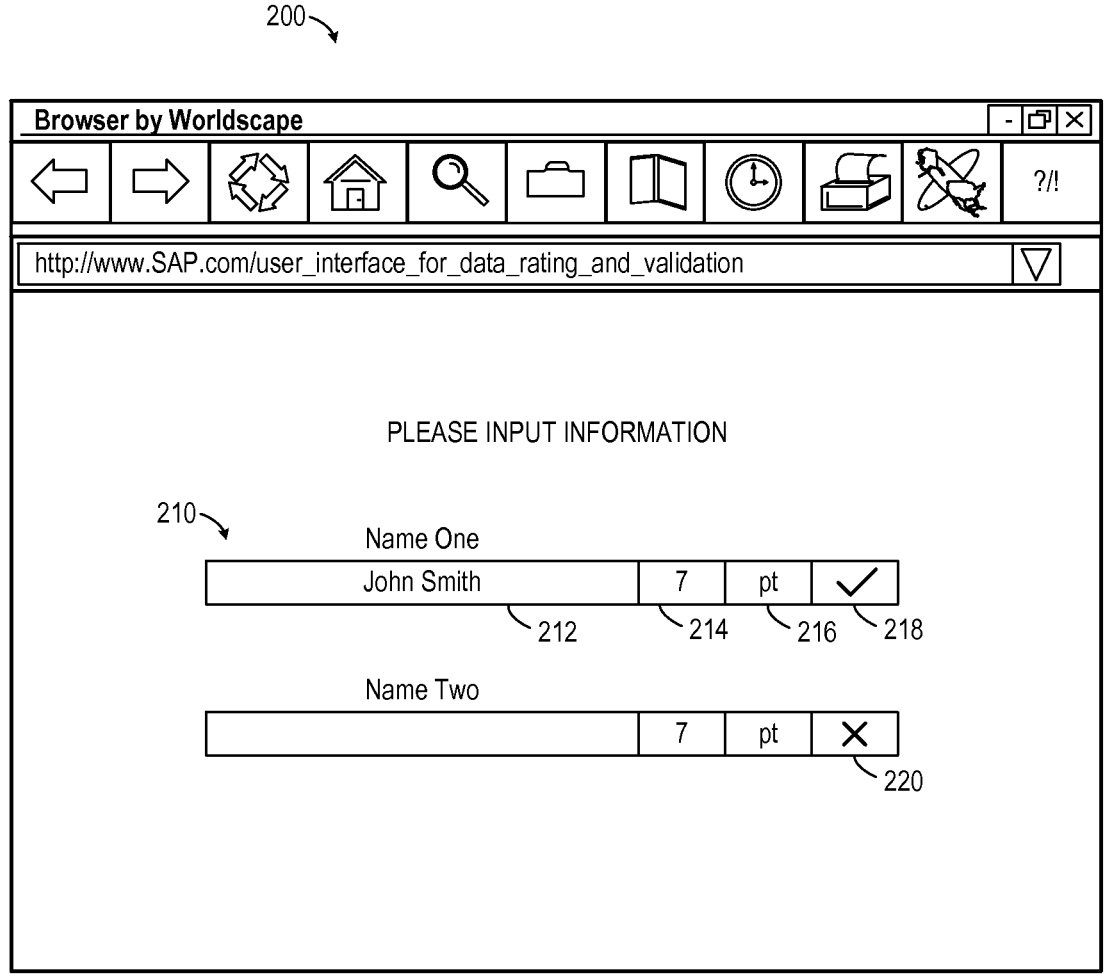
FIG. 2 is an example of a user interface according to some embodiments described herein.

FIG. 2 is an example of a user interface 200 according to some embodiments described herein. In particular, the user interface 200 includes a "Name One" user interface element 210 to receive data content from a user. The user interface element 210 includes a text entry box 212 into which a user can type a name. The element 210 further includes an "input rating value" 214. The input rating value 214 may, for example, reflect the importance of the information entered via the element 210. The element 210 also includes a unit 216 (e.g., "points") and a confirmation state 218. The confirmation state 218 might, for example, indicate whether or not data content received from a user satisfied a pre-determined condition. In the example of FIG. 2, pre-determined condition is merely that the user has entered some information into the text entry box 210. Thus, the confirmation state 218 of the "Name One" user interface element 210 is true (reflected by a check mark) because the user has entered "John Smith." In contrast, the confirmation state of a "Name Two" user interface element 220 is false (reflected by an "X") because the user has not entered any information. Note that that while a user can enter information into the text entry box 212, the input rating value 214, unit 216, and confirmation state 218 are properties which can be set (changed) in the implementation at runtime. They can also get an initial value at design time by the developer in the Integrated Development Environment (IDE) such as those associated with SAP, web Dynpro, Eclipse, etc.

Such an approach may help visualize the importance of input data on the user interface 200. Moreover, it may enable a user or business service provider to measure a quality of data content (e.g., associated with a weighted completeness) and be used to rate, for example, the work of a data typist or call center agent (e.g., by analyzing a number of achieved points).

Further, the look and feel of rated information may be provided in a somewhat standardized fashion.

According to some embodiments, a new user interface control named "RatedInputField" may provide an enriched an input field (e.g., associated with free text entry, a drop down selection, or checkbox etc) with a rating property and a confirmation state property. Note that the rating property and/or confirmation state property might be displayed to a user with an appropriate visualization or may instead be hidden from the user.

Figure 3:
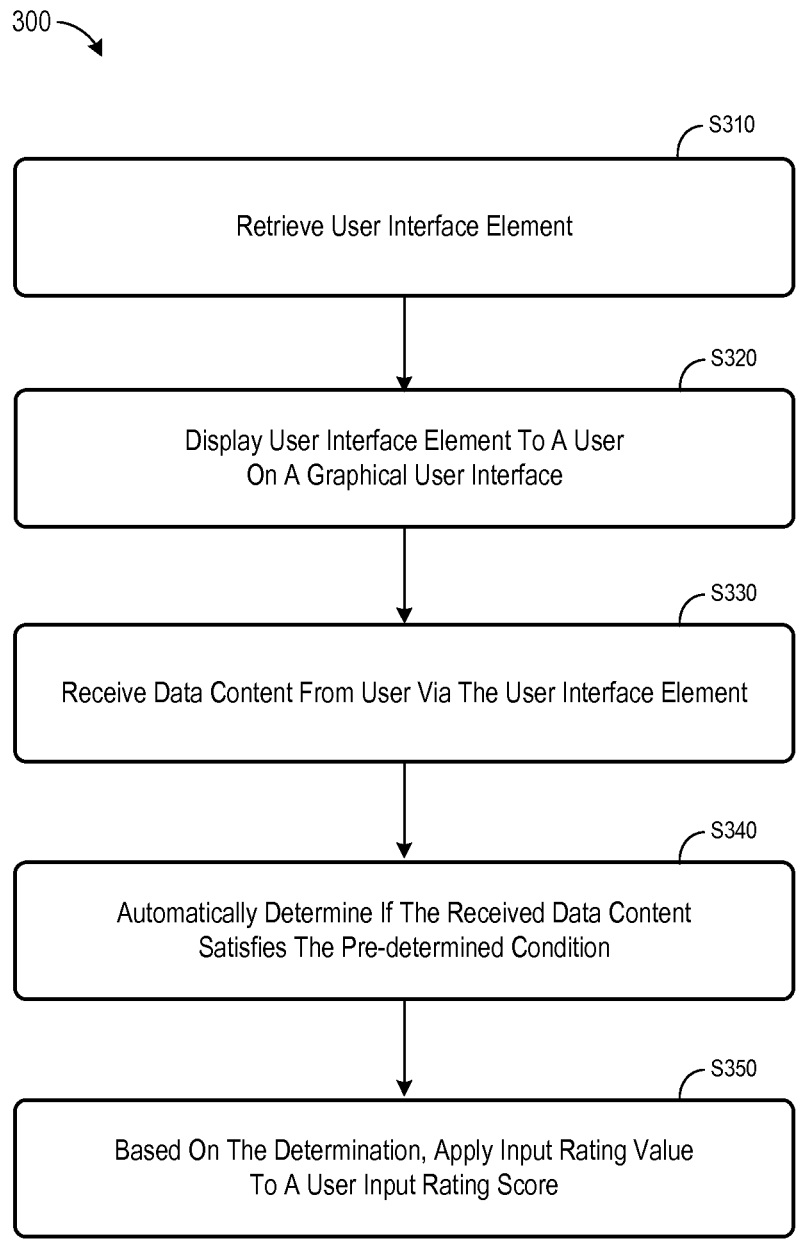
FIG. 3 is a flow diagram of a run time process according to some embodiments.

Any of the user interface elements described herein might, according to some embodiments, be created by a user interface designer (e.g., by a key user at design time) and be stored into a table or database. That information may later be retrieved from the table or database and used to display and/or control the operation of the user interface element with respect to a user at run time. FIG. 3 is a flow diagram of a run time process 300 according to some embodiments. The business service provider 110 and/or client 120 may execute portions of the process 300 as will be described below, but embodiments are not limited thereto. In this regard, all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments may be practiced in any order that is practicable.

The process 300 may be executed, for example, when a user interface, containing any of the user interface elements described herein, is displayed to a user. At S310, information at the user interface element is retrieved (e.g., from a table or database). The retrieved information might include, for example, the "type" of user interface element. The type might be, for example, similar to the one described with respect to FIG. 2 or any of the other FIGS. provided herein. The user interface element may, for example, be designed to receive data content from a user in a graphical user interface (e.g., a user might enter a number, make a selection, or type an alphanumeric string to provide the data content). The retrieved information may also include an input rating value and a pre-determined condition that are associated with the user interface element. The pre-determined condition may, for example, be "is the data content not blank?" As another example, the pre-determined condition might be "is the data content equal to three?"

According to some embodiments, the input rating value is further associated with an input rating unit (e.g., a point value or a monetary value).

At S320 the user interface element is displayed to a user on a graphical user interface, and data content is received from the user (via the user interface element) at S330. The data content may be, for example, associated with a text input field, a multiple choice input, a slider, and/or a numerical value.

According to some embodiments, it may subsequently be "automatically" determined at S340 if the received data content satisfies the pre-determined condition of the user interface element. As used herein, the term "automatically" refers to an action that can be taken without human intervention. The pre-determined condition may be associated with, for example, a determination of whether or not any received data content was input by the user, or a comparison of received data content with pre-determined content (e.g., to check to see if the entered information is "correct" or otherwise sufficient) . According to some embodiments, an indication of this determination is provided via the user interface element (e.g., by displaying a check mark or other icon). In some cases, the determination (e.g., confirmation state) is reflected by a change in color (e.g., the element might switch from red to green) or line type (e.g., a dashed box may become solid).

Based on this determination, the input rating value may be automatically applied to a user input rating score associated with that user interface element and/or the graphical user interface at S350. For example, when a user enters his or her last name, the user input rating score associated that user interface element might be increased from 0 to 5 (e.g., when the input rating value for that element is 5 points and the pre-determined condition is "not blank"). According to some embodiments, an indication of the user input rating score is provided via the graphical user interface (e.g., indicating that he or she has achieved "3/5" of the point available on that display).

Thus, a backend may be used to design a user interface element and there may also be some validation at the client computer regarding whether data received from the user complies with some pre-defined conditions (or rules). Note that a user interface element may be associated with properties (like visibilities) and also events. If an event is triggered, a special method in the implementation may called (this is the event handler method). As a result, the user interface element may be implemented with an event "ValueChanged" which triggers a OnValueChangedMethod( ). This would be the entry point where a developer could write a validation method depending on the application context. Typically, the validation method may check the user input and calculate a rating value and the confirmation state and then change these properties.

Figure 4:
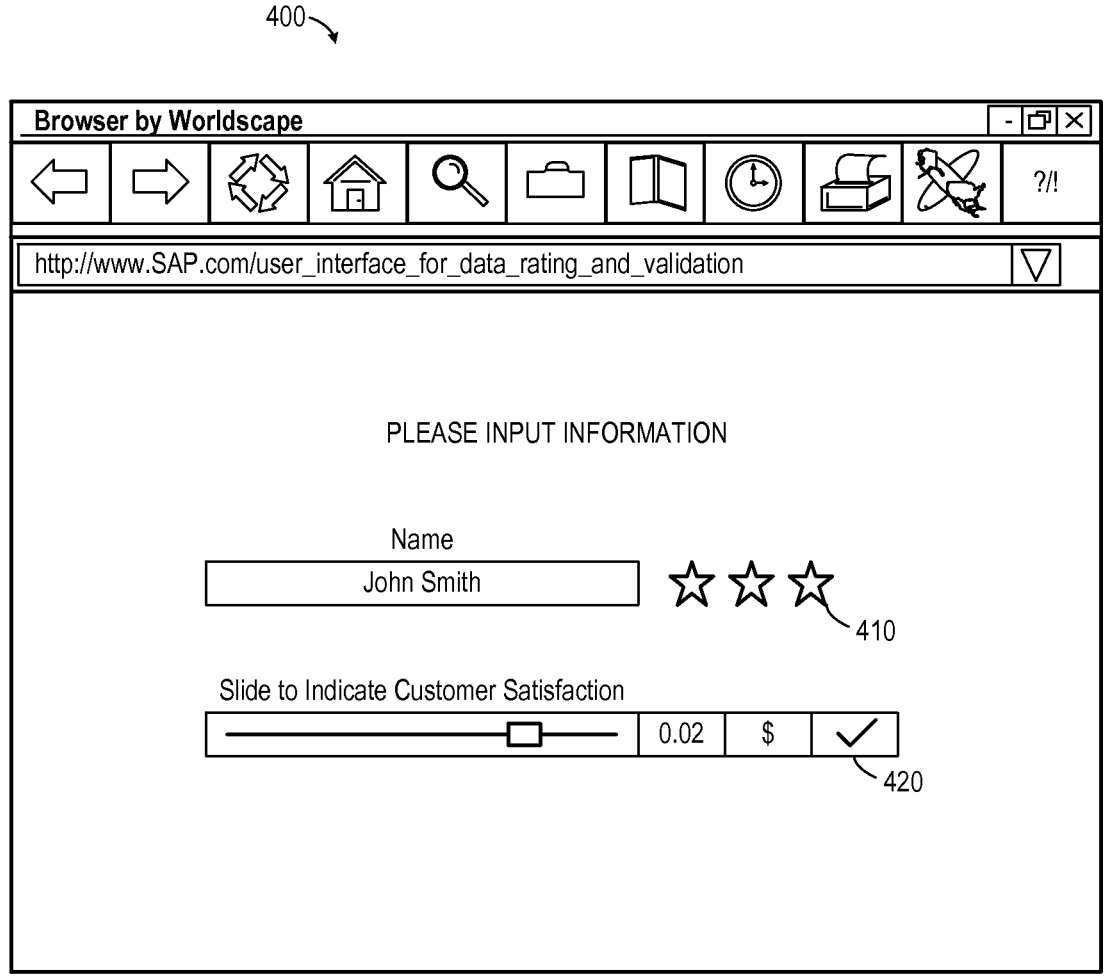

Note that the user interface element 210 described with respect to FIG. 2 is only one example of a type of element that may be provided in accordance with any of the embodiments described herein, and that any number of other implementations may be provided instead. For example, FIG. 4 illustrates a user interface 400 with a user interface element 410 that graphically displays the input rating value (e.g., as a number of stars). Moreover, another user interface element 420 is provided as a user slide input (and the unit value in this case is associated with a monetary value).

Figure 5:
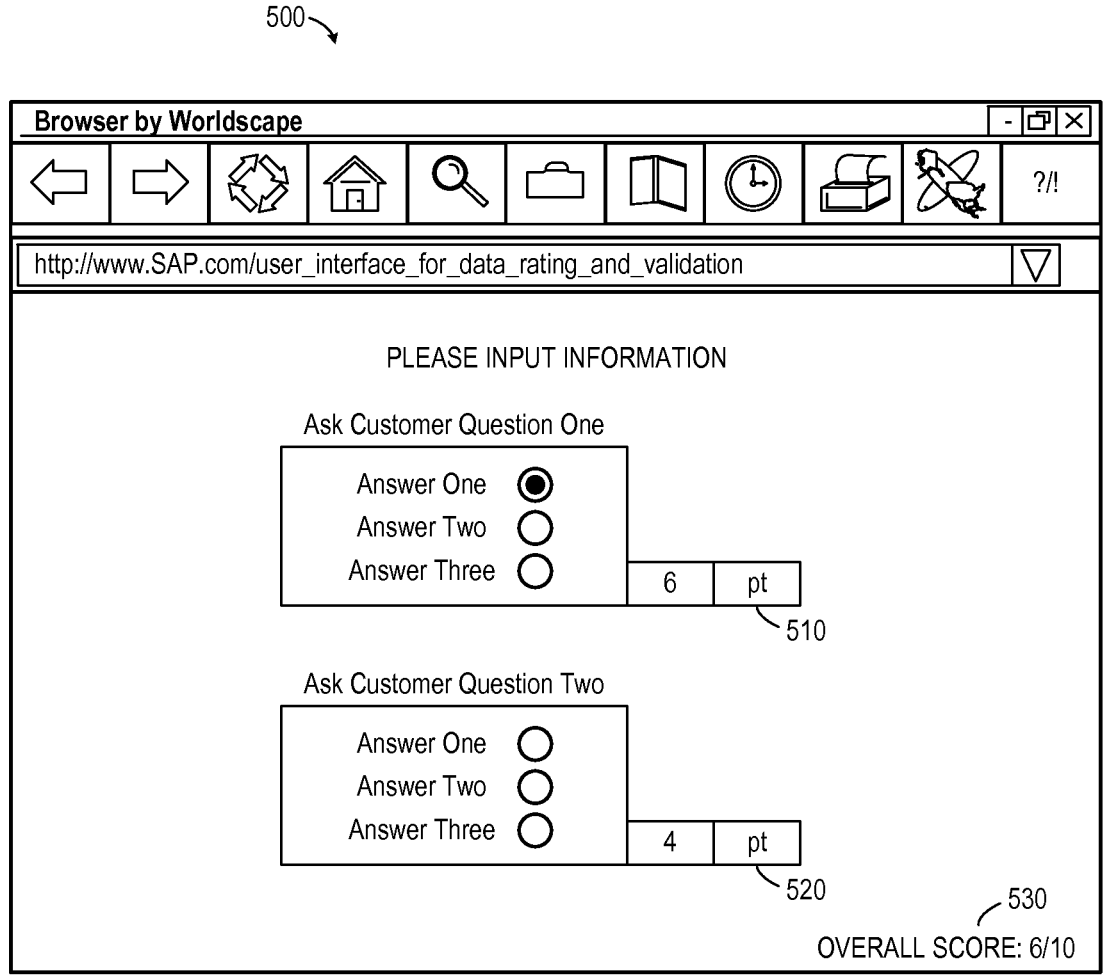

As still another example, FIG. 5 illustrates a user interface 500 with two multiple choice user interface elements 510, 520. Note that an overall score 530 may also be provided (e.g., indicating that the user has achieved 6 out of a possible 10 points on the display. Further note that in these elements 510, 520 the confirmation status is not displayed to the user at all (e.g., there is no check mark next to the elements 510, 520). Also note that that the 6 point input rating value of element 510 might be applied to the overall score 530 when the user (1) selects any of the three answers or (2) only when the user selects a "correct" answer.

Thus, some embodiments described herein may provide technical support for "rating data" by introducing intelligent user interface controls (e.g., an enhanced input field) which do not only store/display the input value but also a "rating value" (e.g., 3) and a confirmation state (e.g., yes/no or green/red). As a result, reduced development effort may be enjoyed by application designers, a unified and consistent look and feel for applications may be provided, and a code quality and code maintenance tasks may be improved.

In some cases, a simple measurement of data quality may be achieved. That is, a data record might be rated and the result shown to a user in real-time. The rating might also be used for calculations in an application without a significant amount of work by the designer.

According to some embodiments, intelligent data rating user interface controls may also be used to define different levels of mandatory fields. In addition, an application might change the mandatory level according to a use case or different roles of users. For example, a customer might have a strict mandatory level (e.g., 3) therefore has to enter his or her complete address (mandatory level 2). A call center agent might have a lower mandatory level (e.g., 1) thus only has to enter the complete name (mandatory level 1) in the same application.

According to some embodiments, a rated user input control (e.g., input field) may be associated with some or all of the following information:

| Value | (e.g., 210, Smith) |
|---|---|
| Type | (e.g., String, Integer) |
| Visibility | (e.g., true, false) |
| Rating Value | (e.g., 4) |
| Rating Value Visibility | (true, false) |
| Maximum Rating Value | (e.g., 20) |
| Maximum Rating Visibility | (true, false) |
| Confirmation Status | (true, false, not set) |
| Visualization | (e.g., checkmarks, colors, user icons) |
| Confirmation Visibility | (true, false) |
| Unit Text | (e.g., $ or pt) |
| Unit Visibility | (true, false) |

In some cases, the rated user input control might also be assigned to a "group" of user interface elements, and the data rating value and the confirmation state might also be used for creating questionnaire applications and/or user tests. For example, a number of points for each answer can stored in the rating value The correctness of the answer can be stored in the confirmation state, and the complete result data and state can shown in a data rating group.

For example, FIG. 6 illustrates a user interface 600 having a group of user interface elements 610 including a first name and a last name. According to some embodiments, the 7 points associated the group 610 is only applied to the overall score 640 when both "First" and "Last" names are provided. According to other embodiments, each of these elements might be awarded 7 points. Similarly, another group 620 includes three user interface elements (and one has not yet been completed as illustrated by the dashed box in FIG. 6). Note that non-group user input elements 630 may also be provided on the display.

Thus, a user interface element may be part of a group of user interface elements, and at least one attribute of the group (e.g., an input rating value) is applied to the user interface element. Moreover, an overall user interface score may be automatically calculated (and displayed) based on a plurality of determinations and applications of input rating values. It may also be determined whether or not the overall user interface score meets a predetermined overall score value (e.g., he or she has entered a sufficient amount of information and may continue to another user interface screen). In some cases, the predetermined overall score value (e.g., a mandatory amount of input) is based at least in part on a user identifier. For example, an online consumer customer might need to provide his or her residential address to receive an ordered purchase, while a call center agent might only collect email addresses from persons he or she is calling. Therefore, the consumer might have a strict mandatory level of input (and has to enter his or her complete residential address). The call center agent, however, might only need to enter a name and email address According to some embodiments, a user interface control "RatingGroup" group/assign RatedInputFields which belong together in a business semantic. Moreover, the RatingGroup might not be visible itself but instead provide a sum of rating points of all assigned RatedInputFields which are confirmed as valid input. According to some embodiments, a rated user input control group may be associated with some or all of the following information:

| | |
|---|---|
| Rating Value | (e.g., 4) |
| Rating Value Visibility | (true, false) |
| Max Rating Value | (e.g., 20) |
| Max Rating Visibility | (true, false) |
| Unit Text | (e.g., $ or pt) |
| Unit Visibility | (true, false) |
| Confirmation State | (true, false, not set, "yellow") |
| Visualization | (e.g., checkmarks, colors, user icons) |
| Confirmation Visibility | (true, false) |

The rated user input control group may also be associated with a calculation rule, such as an automatic summation of child values, an automatic summation that ignores confirmation states, or some other user defined calculation.

According to some embodiments, data rating groups can also be grouped (with other groups and single rated data user interface elements). This may enable an application to cover complex scenarios (e.g., mapping a business partner record group to a business partner address data group to a business data street, street number, country, postal code, city user interface control).

Figure 7:
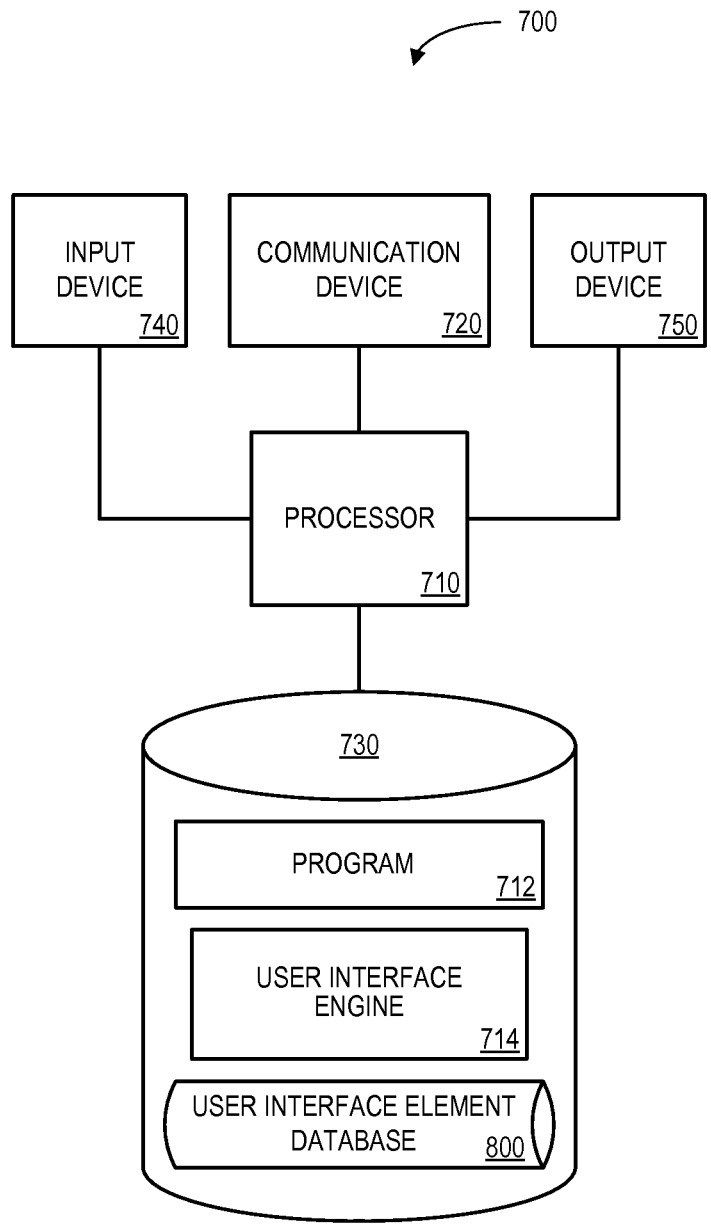
FIG. 7 is a block diagram of a system according to some embodiments.

FIG. 7 is a block diagram overview of a user interface platform 700 according to some embodiments. The user interface platform 700 may be, for example, associated with any of the devices described herein. The user interface platform 700 comprises a processor 710, such as one or more commercially available Central Processing Units (CPUs) in form of one-chip microprocessors, coupled to a communication device 720 configured to communicate via a communication network (not shown in FIG. 7). The communication device 720 may be used to communicate, for example, with one or more client devices or business service providers. The user interface platform engine 700 further includes an input device 740 (e.g., a mouse and/or keyboard to enter content) and an output device 750 (e.g., a computer monitor to display a user interface element).

The processor 710 communicates with a storage device 730. The storage device 730 may comprise any appropriate information storage device, including combinations of magnetic storage devices (e.g., a hard disk drive), optical storage devices, and/or semiconductor memory devices.

The storage device 730 stores a program 712 and/or user interface engine application 714 for controlling the processor 710. The processor 710 performs instructions of the programs 712, 714, and thereby operates in accordance with any of the embodiments described herein. For example, the processor 710 may create a user interface element to receive data content in a graphical user interface, wherein the received data content is assigned an input rating value. The processor 710 may also automatically determining if data content received from a user via the user interface element satisfies a pre-determined condition. Finally, the processor 710 may, based on that determination, automatically apply the input rating value to a user input rating score associated with the graphical user interface.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the user interface platform 700 from another device; or (ii) a software application or module within the user interface platform 700 from another software application, module, or any other source.

In some embodiments (such as shown in FIG. 7), the storage device 730 stores a user interface element database 800 to facilitate the entry and/or evaluation of information. One example of a database 800 that may be used in connection with the user interface platform 700 will now be described in detail with respect to FIG. 8.

Figure 8:
FIG. 8 is a portion of a tabular user interface element database that may be stored according to some embodiments.

Referring to FIG. 8, a table is shown that represents the user interface element database 800 that may be stored at the user interface platform 700 according to some embodiments. The table may include, for example, entries identifying user interface elements. The table may also define fields 802, 804, 806, 808, 810 for each of the entries. The fields 802, 804, 806, 808, 810 may, according to some embodiments, specify: a user interface element identifier 802, a user interface element type 804, an input rating value 806, a unit 808, and a predetermined condition for confirmation 810. The information in the user interface element database 800 may be created and updated, for example, based on information received from a user interface designer.

The user interface element identifier 802 may be, for example, an alphanumeric code associated with a particular user interface element. The element type 804 might indicate, for example, that the element is a text entry box or multiple choice entry. The input rating value 806 and associated unit 808 might reflect the importance or interest associated with the element. The predetermined condition for confirmation 810 may define when the user has entered sufficient or correct data content.

Figure 9:
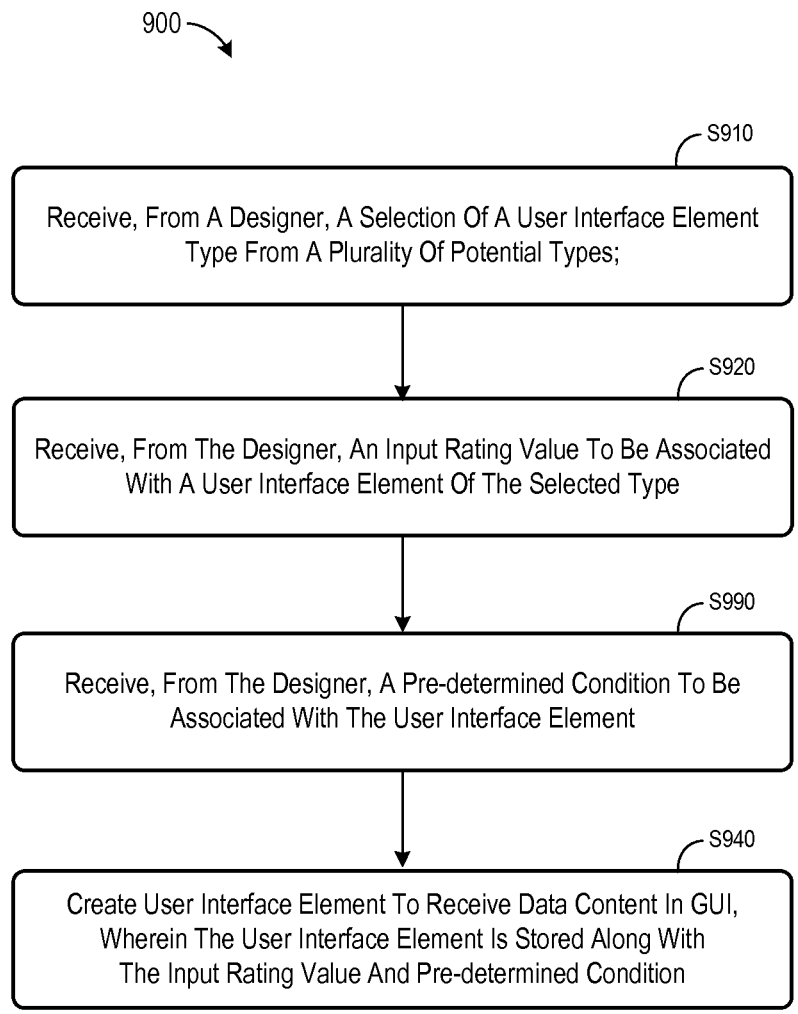
FIG. 9 is a flow diagram of a design time process according to some embodiments.

Note that the information in the user interface element database 800 might be based on information received from a designer. FIG. 9 is a flow diagram of a design time process 900 that might be performed, for example, by the business service provider 110 and/or client 120. According to some embodiments, the user interface elements described herein are created by a designer at design time (e.g., associated with a business service provider or a key user of a client). For example, at S910 a selection of a pre-determined user interface element type from a plurality of potential types may be received from a key user (e.g., who might not be technically able to create advanced programs). The selected type might be, for example, similar to the one described with respect to FIG. 2 or any of the other FIGS. provided herein. At S920, an input rating value to be associated with a user interface of the selected type may be received from a designer. In some embodiments, each of type of user interface elements is associated with a default input rating value and receiving the input rating value from the designer for the selected user interface element type comprises receiving an adjustment to the default input rating value for the selected user interface element type. At S930, a pre-determined condition may be received from the designer. The pre-determined condition may, for example, be "is the data content not blank?" As another example, the pre-determined condition might be "is the data content equal to three?"

Figure 10:
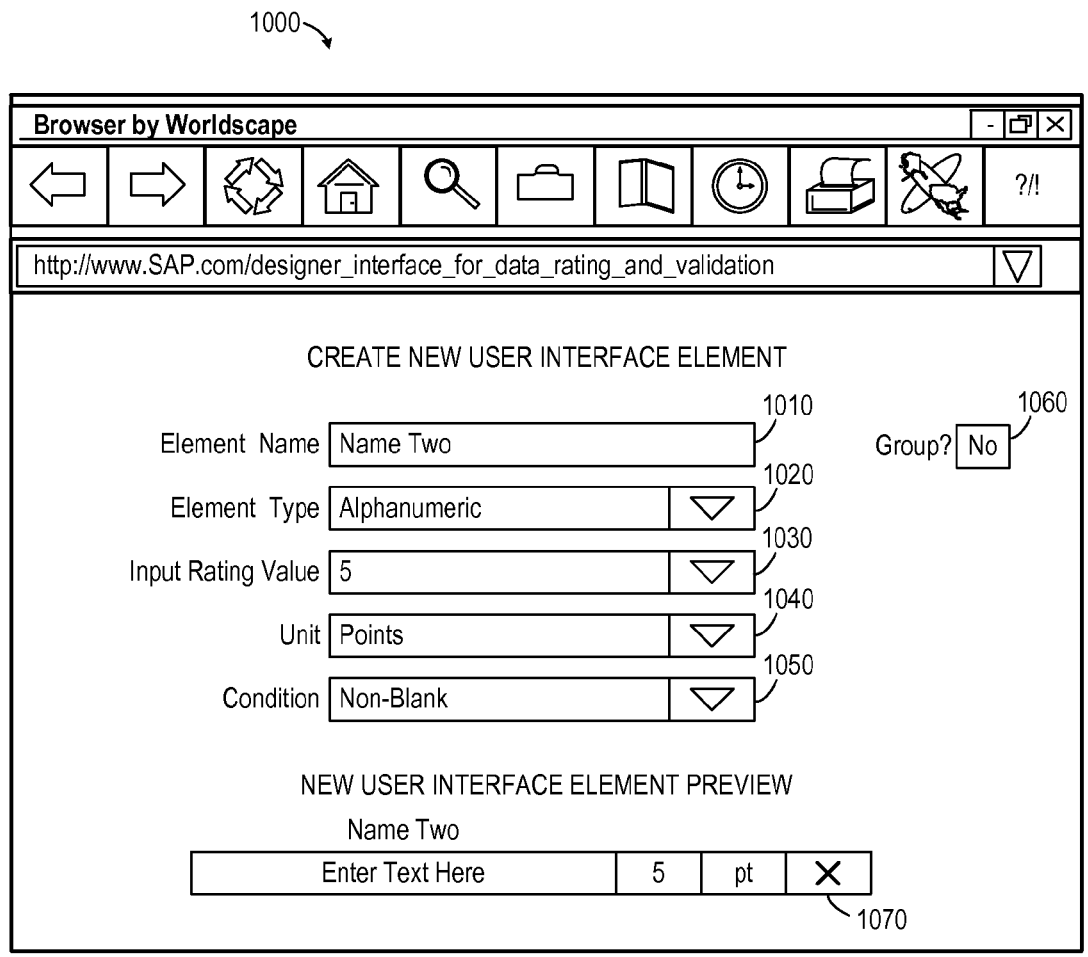
FIG. 10 illustrates a designer user interface in accordance with some embodiments.

At S940, the user interface element may then be created to later receive data content in the graphical user interface. The user interface element may, in some cases, be stored in the user interface database 800 along with the input rating value and associated pre-determined condition. That is, the user interface element database 800 may store information, created by a designer at design time, that will later be retrieved to facilitate a display of a user interface at run time. Note that the information may be received from the designer in any of a number of different ways. For example, FIG. 10 illustrates a designer user interface 1000 in accordance with some embodiments. In this example, an element name may be entered by the designer (e.g., a designer associated with a business service provider) in an element name input field 1010, and he or she may also select the element type using an element type selection 1020 (e.g., alphanumeric or multiple choice). An input rating value to be associated with a user interface element may be received from the designer via an input rating value field 1010 along with the appropriate units via a unit input field 1040. Moreover, a pre-determined condition may be received from the designer via selection 1050. The pre-determined condition may, for example, be "is the data content not blank?" As another example, the pre-determined condition might be "is the data content equal to three?" Note that information received via elements 1010, 1020, 1030, 1040, 1050 might create an entry in the user interface element database 800 of FIG. 8 (e.g., with each element being associated with a column in the database 800). In some cases, the designer may indicate whether or not the element is part of a larger group via group input 1060. A preview version 1070 of the user interface element may, in some embodiments, be displayed to the designer.

The user interface element may then be created, in accordance with the designer's selections, to receive data content in the graphical user interface. The user interface element may, in some cases, be stored along with the input rating value and associated pre-determined condition (e.g., in the user interface element database 800).

Figure 11:
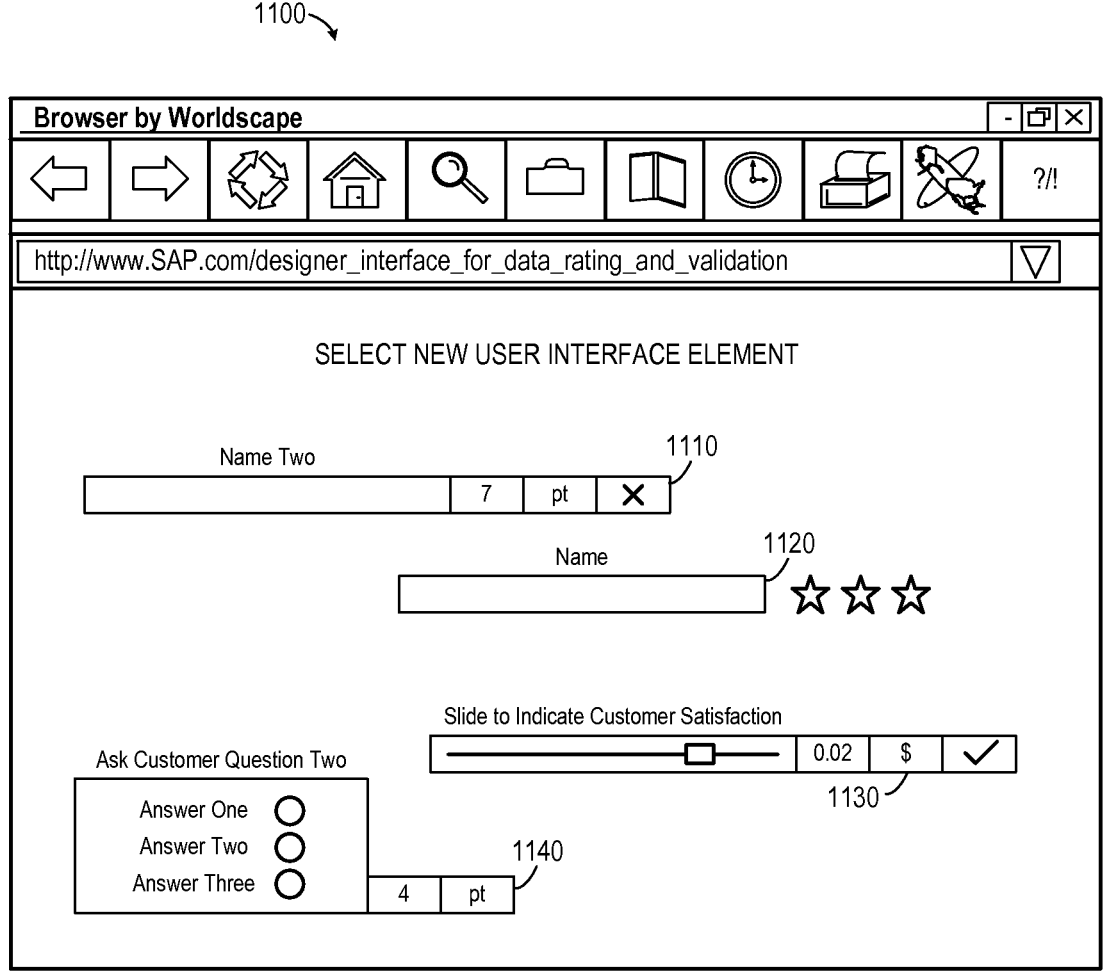
FIG. 11 illustrates another designer user interface in accordance with some embodiments.

FIG. 11 illustrates another designer user interface 1100 in accordance with some embodiments. In this case, the designer (e.g., a key user of a client) may simply select one of a number of pre-defined user interface elements 1110, 1120, 1130, 1140 in accordance with any of the embodiments described herein. According to some embodiments, the designer may then customize the pre-defined user interface elements as needed.

Thus, some embodiments described herein may provide user interface controls which accelerate the development of user interfaces, such as questionnaires. That is, a designer may have access to one or more templates or complex user interface elements (or front-end controls) such as those illustrated in FIG. 11 that can be simply selected and configured prior to run-time. As a result, programming complexities (e.g., coding and testing) may be reduced via the use of ready-to-customize user interface elements. Moreover, the look and feel of the elements may be standardized and the visualization of data importance to users may be improved. Note that the customizable user interface elements may be available in an IDE system.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
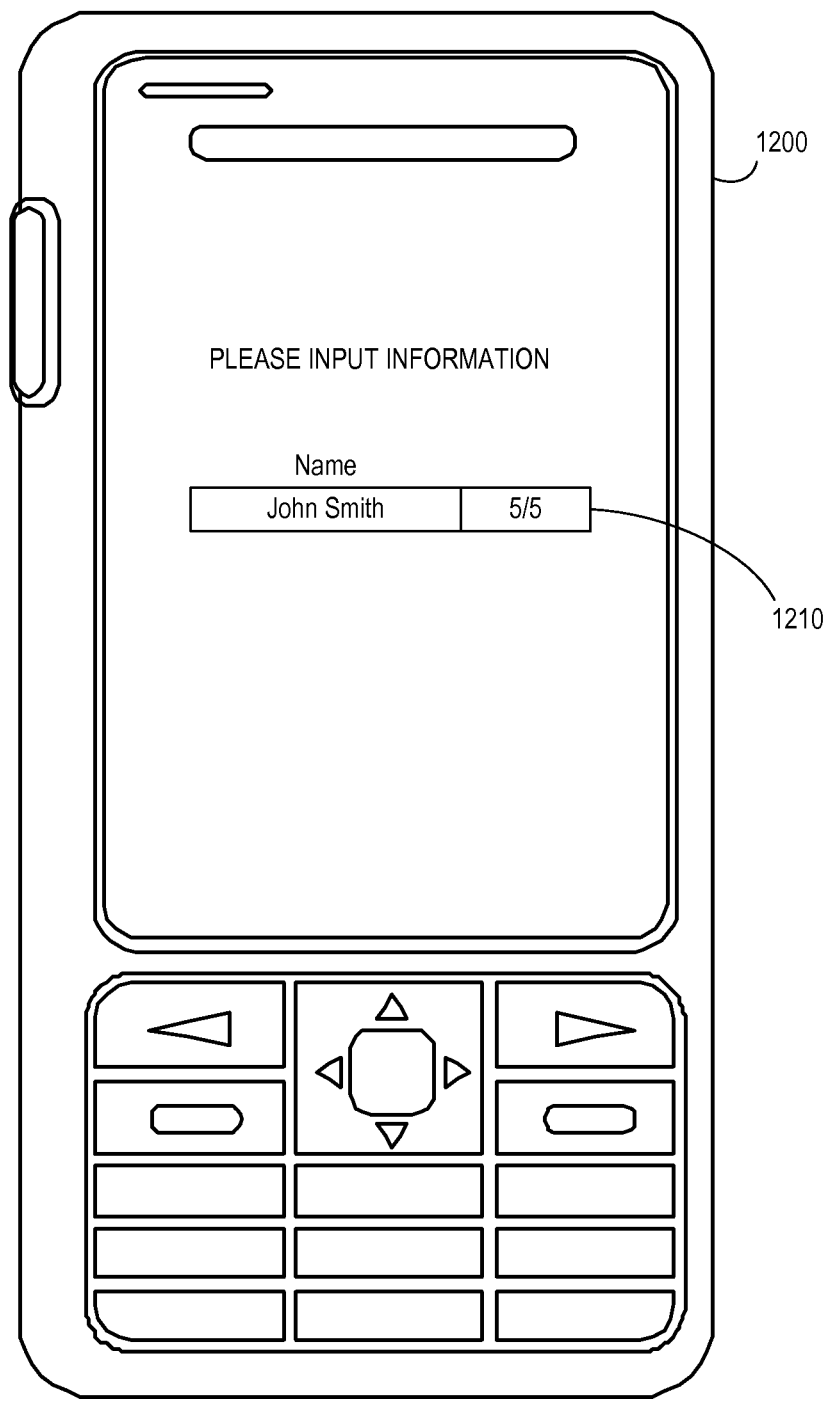
FIG. 12 is an example of a user interface for a portable device in accordance with some embodiments described herein.

Although embodiments have been described with respect to web browser displays, note that embodiments may be associated with other types of user interface displays. For example, FIG. 12 is an example of a user interface for a portable device 1200, such as a smart phone or Personal Digital Assistant (PDA), with a user interface element 1210 in accordance with some embodiments described herein. Note that the user interface element 1210 implicitly displays a confirmation state (e.g., by displaying that 5 out of a possible 5 points have been earned by the user).

Moreover, embodiments may be implemented using a single user interface element or several linked user interface elements. For example, a rating and confirmation state might not be part of an input field itself, but—like a label element— they might be separate user interface elements technically assigned to the corresponding input field.

Embodiment have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented design time method, comprising:
   receiving, from a designer, a selection of a user interface element type from a plurality of potential types, each of the potential types of user interface elements being adapted to facilitate a reception of data content in a graphical user interface;
   receiving, from the designer, an input rating value to be associated with a user interface element of the selected type;
   receiving, from the designer, a pre-determined condition to be associated with the user interface element; and
   creating the user interface element for the graphical user interface, wherein the user interface element is stored along with the input rating value and pre-determined condition;
   wherein each one of the plurality of potential types of user interface elements are associated with a default input rating value to be applied to a user input rating score if the data content satisfies the pre-determined condition associated with the one of the plurality of potential types of user interface elements;
   wherein said receiving from the designer an input rating value comprises receiving an adjustment to the default input rating value for the selected user interface element type;
   wherein the user interface element is a first user interface element of a rated group of user interface elements in the graphical user interface;
   wherein the first user interface element of the rated group of user interface elements in the graphical user interface includes a first field to display data input by a user;
   wherein a second user interface element of the rated group of user interface elements in the graphical user interface includes a second field to display data input by a user; and
   wherein the first field of the first user interface element and the second field of the second user interface element are each displayed in a same view of the graphical user interface;
   the method further comprising:
   defining a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role;

wherein the rated group is associated with a calculation rule comprising one or more of: an automatic summation of child values, an automatic summation that ignores confirmation states, or some other user defined calculation.

2. The method of claim 1, wherein said receiving from the designer an input rating value comprises receiving an adjustment to the default pre-determined condition for the selected user interface element type.

3. The method of claim 1, wherein the pre-determined condition received from the designer is associated with at least one of: (i) a determination of whether any received data content was input by the user, or (ii) a comparison of received data content with pre-determined content.

4. The method of claim 1, further comprising:
based on information received from the designer, associating the created user interface element with the rated group of user interface elements.

5. The method of claim 1, wherein the user interface element comprises a plurality of linked user interface elements.

6. The method of claim 1, wherein the defining a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role comprises:
defining a mandatory amount of input for the rated group of user interface elements based at least in part on a user identifier, the mandatory amount of input including the first field of the first user interface element and the second field of the second user interface element in a case that the user identifier is associated with an online customer, the mandatory amount of input including the first field of the first user interface element but not the second field of the second user interface element in a case that the user identifier is associated with a call center agent.

7. The method of claim 6, wherein the second field of the second user interface element comprises a residential address field.

8. The method of claim 1, further comprising:
receiving, from the designer via a menu, a selection of a type of visualization that is to be used to indicate a change in whether the data content satisfies the pre-determined condition associated with the one of the plurality of potential types of user interface elements, wherein the menu includes: (i) a first type of visualization that indicates the change by a change in a color that is displayed, and (ii) a second type of visualization that indicates the change by changing an icon that is displayed.

9. The method of claim 1, further comprising:
arranging to determine whether data content received from the user via the graphical user interface meets the mandatory amount of input for the rated group of user interface elements.

10. The method of claim 1, wherein the first field of the first user interface element is to display alphanumeric data typed by a user; and
wherein the second field of the second user interface element is to display alphanumeric data typed by a user.

11. The method of claim 1, wherein the mandatory amount of input in a case that the user identifier is associated with the first role comprises a mandatory amount of input to be entered by a user having the first role; and
wherein the mandatory amount of input in a case that the user identifier is associated with the second role comprises a mandatory amount of input to be entered by a user having the second role.

12. The method of claim 1, wherein the first field of the first user interface element and the second field of the second user interface element are each displayed in a first view of the graphical user interface in the case that the user identifier is associated with the first role; and
wherein the first field of the first user interface element and the second field of the second user interface element are each displayed in a second view of the graphical user interface in the case that the user identifier is associated with the second role.

13. The method of claim 1, wherein the mandatory amount is a mandatory amount of input to be entered by a user to continue to another view of the graphical user interface.

14. The method of claim 1, wherein the mandatory amount of input in a case that the user identifier is associated with the first role is a mandatory amount of input to be entered by a user having the first role to continue to another view of the graphical user interface; and
wherein the mandatory amount of input in a case that the user identifier is associated with the second role is a mandatory amount of input to be entered by a user having the second role to continue to another view of the graphical user interface.

15. A computer implemented run time method, comprising:
retrieving a user interface element created by a designer, the user interface element being associated with an input rating value and a pre-determined condition;
displaying the user interface element to a user on a graphical user interface;
receiving data content from the user via the user interface element;
automatically determining if the received data content satisfies the pre-determined condition; and
based on said determination, automatically applying the input rating value to a rating score that is a measure of quality of data content that: (i) is received from the user via the graphical user interface and (ii) includes the data content received from the user via the user interface element of the graphical user interface;
wherein the user interface element is a first user interface element of a rated group of user interface elements in the graphical user interface;
wherein the first user interface element of the rated group of user interface elements in the graphical user interface includes a first field to display data input by a user;
wherein a second user interface element of the rated group of user interface elements in the graphical user interface includes a second field to display data input by a user; and
wherein the first field of the first user interface element and the second field of the second user interface element are each displayed in a same view of the graphical user interface;
the method further comprising:
determining a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role;

wherein the rated group is associated with a calculation rule comprising one or more of: an automatic summation of child values, an automatic summation that ignores confirmation states, or some other user defined calculation.

16. The method of claim 15, wherein the pre-determined condition is associated with at least one of: (i) determining if any received data content was input by the user, or (ii) comparing received data content with pre-determined content.

17. The method of claim 15, further comprising:
providing a confirmation state indication of said determination via the user interface element.

18. The method of claim 17, wherein the confirmation state indication comprises at least one of: (i) a display of an icon, (ii) a change in color, or (iii) a change in line type.

19. The method of claim 15, further comprising:
providing an indication of the user input rating score via the graphical user interface.

20. The method of claim 15, wherein the input rating value is associated with an input rating unit, and the input rating unit comprises at least one of: (i) a point value, or (ii) a monetary value.

21. The method of claim 15, wherein at least one attribute of the rated group is applied to the user interface element.

22. The method of claim 15, wherein the graphical user interface includes a plurality of user interface elements, each associated with an input rating value and a different rating group, and further comprising:
automatically calculating an overall user interface score based on a plurality of determinations and applications of input rating values; and
providing an indication associated with the overall user interface score via the graphical user interface.

23. The method of claim 22, further comprising:
determining whether the overall user interface score meets a predetermined overall score value.

24. The method of claim 23, wherein the predetermined overall score value is based at least in part on a user identifier.

25. The method of claim 15, wherein the user interface element is associated with at least one of: (i) a text input field, (ii) a multiple choice input, (iii) a slider, or (iv) a numerical value.

26. The method of claim 15, further comprising:
determining whether data content received from the user via the graphical user interface meets the mandatory amount of input for the rated group of user interface elements.

27. The method of claim 15, wherein the rating score that is the measure of quality of data content that: (i) is received from the user via the graphical user interface and (ii) includes the data content received from the user via the user interface element of the graphical user interface comprises:
a rating score used to rate work of the user.

28. A computer-readable medium storing program code executable by a computer to:
receive, from a designer, a selection of a user interface element type from a plurality of potential types, each of the potential types of user interface elements being adapted to facilitate a reception of data content in a graphical user interface;
receive, from the designer, an input rating value to be associated with a user interface element of the selected type;
receive, from the designer, a pre-determined condition to be associated with the user interface element; and
create the user interface element, wherein the user interface element is stored along with the input rating value and pre-determined condition;
wherein each one of the plurality of potential types of user interface elements are associated with a default input rating value to be applied to a user input rating score if the data content satisfies the pre-determined condition associated with the one of the plurality of potential types of user interface elements;
wherein said receive from the designer an input rating value comprises receive an adjustment to the default input rating value for the selected user interface element type; and
wherein the user interface element is a first user interface element of a rated group of user interface elements in the graphical user interface;
wherein the first user interface element of the rated group of user interface elements in the graphical user interface includes a first field to display data input by a user;
wherein a second user interface element of the rated group of user interface elements in the graphical user interface includes a second field to display data input by a user; and
wherein the first field of the first user interface element and the second field of the second user interface element are each displayed in a same view of the graphical user interface;
the program code further executable by the computer to:
define a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role;
wherein the rated group is associated with a calculation rule comprising one or more of: an automatic summation of child values, an automatic summation that ignores confirmation states, or some other user defined calculation.

29. The medium of claim 28, wherein the pre-determined condition is associated with at least one of: (i) determining if any received data content was input by the user, or (ii) comparing received data content with pre-determined content.

30. The medium of claim 28, the program code further executable by the computer to:
receive, from the designer via a menu, a selection of a type of visualization that is to be used to indicate a change in whether the data content satisfies the pre-determined condition associated with the one of the plurality of potential types of user interface elements, wherein the menu includes: (i) a first type of visualization that indicates the change by a change in a color that is displayed, and (ii) a second type of visualization that indicates the change by changing an icon that is displayed.

31. The medium of claim 28, wherein the define a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role comprises:

define a mandatory amount of input for the rated group of user interface elements based at least in part on a user identifier, the mandatory amount of input including the first field of the first user interface element and the second field of the second user interface element in a case that the user identifier is associated with an online customer, the mandatory amount of input including the first field of the first user interface element but not the second field of the second user interface element in a case that the user identifier is associated with a call center agent.

32. The medium of claim 31, wherein the second field of the second user interface element comprises a residential address field.

33. The medium of claim 28, the program code further executable by the computer to:

determine whether data content received from the user via the graphical user interface meets the mandatory amount of input for the rated group of user interface elements.

34. A system, comprising:

an user interface engine to display a user interface element adapted to receive data content in a graphical user interface, wherein the received data content is to be assigned an input rating value; and an evaluation engine to:

automatically determine if received data content received from a user satisfies a pre-determined condition associated with the user interface element, and based on said determination, automatically apply the input rating value to a rating score that is a measure of quality of data content that: (i) is received from the user via the graphical user interface and (ii) includes the data content received from the user via the user interface element of the graphical user interface;

wherein the user interface element is a first user interface element of a rated group of user interface elements in the graphical user interface;

wherein the first user interface element of the rated group of user interface elements in the graphical user interface includes a first field to display data input by a user;

wherein a second user interface element of the rated group of user interface elements in the graphical user interface includes a second field to display data input by a user; and wherein the first field of the first user interface element and the second field of the second user interface element are each displayed in a same view of the graphical user interface;

the system further comprising an engine to:

determine a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role;

wherein the rated group is associated with a calculation rule comprising one or more of: an automatic summation of child values, an automatic summation that ignores confirmation states, or some other user defined calculation.

35. The system of claim 34, wherein the user interface engine provides a confirmation state indication of said determination via the user interface element, the confirmation state indication comprising at least one of: (i) a display of an icon, (ii) a change in color, or (iii) a change in line type.

36. The system of claim 34, the system further comprising an engine to:

receive, from the designer via a menu, a selection of a type of visualization that is to be used to indicate a change in whether the data content satisfies the pre-determined condition associated with the one of the plurality of potential types of user interface elements, wherein the menu includes: (i) a first type of visualization that indicates the change by a change in a color that is displayed, and (ii) a second type of visualization that indicates the change by changing an icon that is displayed.

37. The system of claim 34, wherein the define a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role comprises:

define a mandatory amount of input for the rated group of user interface elements based at least in part on a user identifier, the mandatory amount of input including the first field of the first user interface element and the second field of the second user interface element in a case that the user identifier is associated with an online customer, the mandatory amount of input including the first field of the first user interface element but not the second field of the second user interface element in a case that the user identifier is associated with a call center agent.

38. The system of claim 37, wherein the second field of the second user interface element comprises a residential address field.

39. The system of claim 34, further comprising:

an engine to determine whether data content received from the user via the graphical user interface meets the mandatory amount of input for the rated group of user interface elements.

40. A computer implemented design time method, comprising:

receiving, from a designer, a selection of a user interface element type from a plurality of potential types, each of the potential types of user interface elements being adapted to facilitate a reception of data content in a graphical user interface;

receiving, from the designer, an input rating value to be associated with a user interface element of the selected type;

receiving, from the designer, a pre-determined condition to be associated with the user interface element; and creating the user interface element for the graphical user interface, wherein the user interface element is stored along with the input rating value and pre-determined condition;

wherein each of the plurality of potential types of user interface elements are associated with a default pre-determined condition and said receiving from the designer an input rating value comprises receiving an adjustment to the default pre-determined condition for the selected user interface element type;

wherein the user interface element is a first user interface element of a rated group of user interface elements in the graphical user interface;
wherein the first user interface element of the rated group of user interface elements in the graphical user interface includes a first field to display data input by a user;
wherein a second user interface element of the rated group of user interface elements in the graphical user interface includes a second field to display data input by a user; and
wherein the first field of the first user interface element and the second field of the second user interface element are each displayed in a same view of the graphical user interface;
the method further comprising:
defining a mandatory amount of input for the rated group of user interface elements based at least in part on a user identifier, the mandatory amount of input including the first field of the first user interface element and the second field of the second user interface element in a case that the user identifier is associated with a first role, the mandatory amount of input including the first field of the first user interface element but not the second field of the second user interface element in a case that the user identifier is associated with a second role;
wherein the rated group is associated with a calculation rule comprising one or more of: an automatic summation of child values, an automatic summation that ignores confirmation states, or some other user defined calculation.

41. The method of claim 40, further comprising:
arranging to determine whether data content received from the user via the graphical user interface meets the mandatory amount of input for the rated group of user interface elements.

* * * * *